(12) United States Patent
Douglas et al.

(10) Patent No.: US 11,663,020 B2
(45) Date of Patent: May 30, 2023

(54) BOOTSTRAPPING FRAMEWORKS FROM A GENERATED STATIC INITIALIZATION METHOD FOR FASTER BOOTING

(71) Applicant: Red Hat, Inc., Raleigh, NC (US)

(72) Inventors: Stuart Douglas, Orange (AU); David Lloyd, Madison, WI (US)

(73) Assignee: Red Hat, Inc., Raleigh, NC (US)

(*) Notice: Subject to any disclaimer, the term of this patent is extended or adjusted under 35 U.S.C. 154(b) by 378 days.

(21) Appl. No.: 16/670,605

(22) Filed: Oct. 31, 2019

(65) Prior Publication Data

US 2021/0132959 A1 May 6, 2021

(51) Int. Cl.
*G06F 9/445* (2018.01)
*G06F 8/41* (2018.01)
*G06F 9/4401* (2018.01)

(52) U.S. Cl.
CPC .......... *G06F 9/44505* (2013.01); *G06F 8/41* (2013.01); *G06F 9/4401* (2013.01)

(58) Field of Classification Search
CPC ...... G06F 9/44505; G06F 8/41; G06F 9/4401; G06F 9/4552; G06F 9/44–45533
See application file for complete search history.

(56) References Cited

U.S. PATENT DOCUMENTS

| | | | |
|---|---|---|---|
| 7,124,291 B1 | 10/2006 | Fresko | |
| 7,165,108 B2 | 1/2007 | Matena et al. | |
| 7,213,240 B2 * | 5/2007 | Wong | G06F 8/447 717/148 |
| 8,856,734 B2 * | 10/2014 | Thyagarajan | G06F 8/61 717/165 |
| 8,924,922 B2 * | 12/2014 | Biswas | G06F 9/45516 717/104 |
| 9,116,717 B2 * | 8/2015 | Soeder | G06F 9/4486 |
| 9,141,415 B2 * | 9/2015 | Rasmussen | G06F 8/656 |
| 9,495,184 B2 * | 11/2016 | Ajila | G06F 8/447 |
| 9,495,185 B2 * | 11/2016 | Ajila | G06F 8/443 |
| 10,061,570 B2 * | 8/2018 | Ajila | G06F 9/4552 |
| 10,613,834 B2 * | 4/2020 | Sahoo | G06F 8/20 |
| 10,810,110 B1 * | 10/2020 | Thomas | G06F 11/3664 |
| 2005/0114871 A1 * | 5/2005 | Wolff | G06F 9/445 719/331 |
| 2012/0233591 A1 * | 9/2012 | Thyagarajan | G06F 8/61 717/107 |

(Continued)

FOREIGN PATENT DOCUMENTS

CN 104731634 B 6/2018

OTHER PUBLICATIONS

Micronautver. 1.1. Micronaut Foundation. 2019. <avalable at> <https://github.com/micronaut-projects/micronaut-core/tree/1.1.x> User guide at <https://docs.micronaut.io/1.1.0/guide/index.html> commit date Aug. 20, 2019. (Year: 2019).*

(Continued)

*Primary Examiner* — Matthew J Brophy
(74) *Attorney, Agent, or Firm* — K&L Gates LLP

(57) ABSTRACT

A system includes a memory, a processor in communication with the memory, and a compiler. The compiler is configured to initialize at least one class for an application at compilation time, start a framework at compilation time, and serialize a framework container of the framework into a native image at compilation time. The processor is configured to run the native image to start the application.

15 Claims, 6 Drawing Sheets

(56) References Cited

U.S. PATENT DOCUMENTS

| | | | |
|---|---|---|---|
| 2016/0246621 A1* | 8/2016 | Ajila | G06F 9/4552 |
| 2016/0246623 A1* | 8/2016 | Ajila | G06F 9/4552 |
| 2017/0017474 A1* | 1/2017 | Ajila | G06F 9/4552 |
| 2018/0081644 A1* | 3/2018 | Sahoo | G06F 8/20 |
| 2020/0012590 A1* | 1/2020 | Jiang | G06F 11/3684 |
| 2020/0065124 A1* | 2/2020 | Chen | G06F 9/45558 |

OTHER PUBLICATIONS

Micronaut ver. 1.1.4 User Guide available at <https://docs.micronaut.io/1.1.4/guide/index.html>, published at least as of Jul. 25, 2019, see <https://web.archive.org/web/20190725003334/https://docs.micronaut.io/latest/guide/index.html>. (Year: 2019).*

Wimmer, Christian, et al. "Initialize once, start fast: application initialization at build time." Proceedings of the ACM on Programming Languages 3.OOPSLA (2019): 1-29. (Year: 2019).*

Saniukaite, Lijana, "Speeding up Application Development with Bootstrap"; Accessed Date: Aug. 16, 2019; Application Development Best Practices with Bootstrap; Copyright 2010-2019; Toptal, LLC; 25 Pages.

JBOSS; "Chapter 4. Deploying Errai CDI"; Accessed Date: Aug. 16, 2019; https://docs.jboss.org/errai/1.3.2.Final/errai-cdi/reference/html/sid-5931501.html; 2 Pages.

Pixlogix Infotech Pvt. Ltd.; "Bootstrap Responsive Website Design"; Accessed Date: Aug. 16, 2019; Bootstrap FramWork, PSD to Bootstrap Development; © 2007-2019; 6 Pages.

* cited by examiner

BOOTSTRAPPING FRAMEWORKS FROM A GENERATED STATIC INITIALIZATION METHOD FOR FASTER BOOTING

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device.

The containers may encapsulate a runtime environment for an application instance or service. Application instances may be started or replicated across nodes and each application instance may require configuration objects (e.g., lists, collections, arrays, etc. used for configuration), classes, artifacts, dependencies, annotations, libraries, etc. to be loaded at various times.

SUMMARY

The present disclosure provides new and innovative systems and methods for bootstrapping frameworks from a generated static initialization method to provide faster booting. In an example, a system includes a memory, a processor in communication with the memory, and a compiler. The compiler is configured to initialize at least one class for an application at compilation time, start a framework at compilation time, and serialize a framework container of the framework into a native image at compilation time. The processor is configured to run the native image to start the application.

In an example, a method includes initializing, by a compiler, at least one class for an application at compilation time (e.g., prior to runtime). The method also includes starting, by the compiler, a framework at compilation time. Additionally, the method includes serializing, by the compiler, a framework container of the framework into a native image at compilation time. The method also includes running, by a processor, the native image for the application.

In an example, a non-transitory machine-readable medium stores code, which when executed by a processor is configured to initialize at least one class for an application at compilation time (e.g., prior to runtime), start a framework at compilation time, serialize a framework container of the framework into a native image at compilation time, and run the native image for the application.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
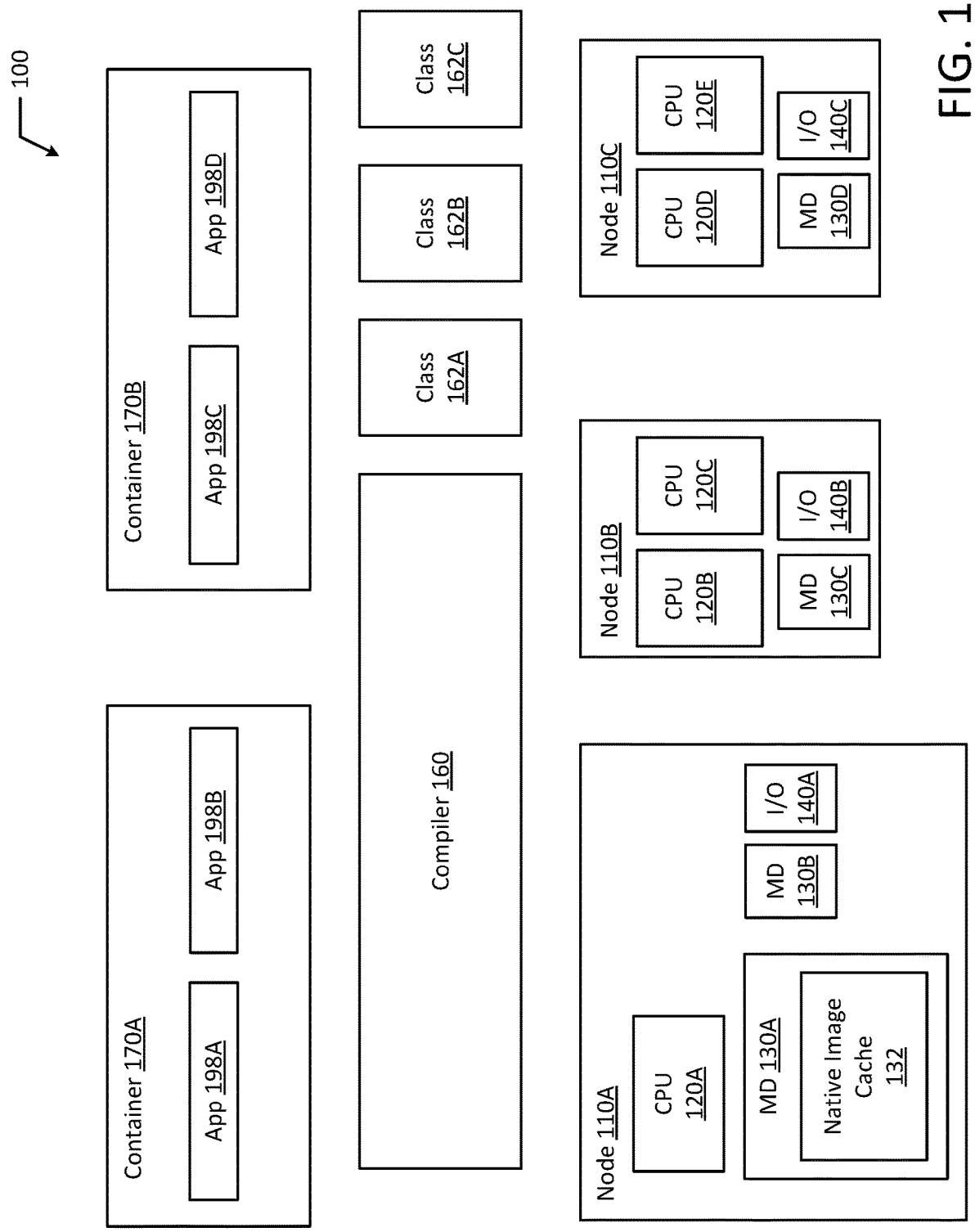
FIG. 1 illustrates a block diagram of an example computing system according to an example embodiment of the present disclosure.

Generally, generating application code at runtime is a complex process. Typically, application metadata is processed at runtime to start application services, which results in slow startup times and additional memory usage during runtime. For example, when the metadata is processed at runtime, eXtensible Markup Language ("XML") and annotations are parsed and then processed at runtime to start an application. Parsing and processing the XML and annotations may involve loading several different classes, which increases the memory footprint of the application. The disadvantages associated with the slower startup times and additional memory usage are augmented when implementing application instances on a cloud. For example, hundreds to thousands of application instances may be deployed and started on the cloud, and each instance may incur these additional memory costs.

Frameworks, such as Substrate VM, which is a component of Graal VM™, allow application developers to compile JAVA Virtual Machine ("JVM") based programs into native code (i.e., programming code that is configured to run on a specific processor such as an executable binary) or a native image. Substrate VM is a framework that allows ahead-of-time ("AOT") instead of just-in-time ("JIT") compilation of JAVA applications into executable images or shared objects so that the resulting executable image can execute natively. For example, JIT compiling may slow down an application's performance because it compiles intermediate code into machine code while the intermediate code is executing. Conversely, AOT compiling occurs before execution rather than during execution. As part of the compilation process, the code that is in a static initialization block (e.g., "init" block, such as clinit) is run in a JVM at image generation time.

Typically, JVM based frameworks have significant overhead when starting, as there is often considerable processing involved in building the framework's internal state. Building the framework's internal state at runtime increases startup time even when using Substrate VM because the processing occurs before the executable binary can start serving requests (e.g., before the native image can be executed to start runtime services of an application).

To automate and simplify the executable binary or native image generation process and to conserve system resources at runtime, techniques are disclosed herein to generate a static initialization method and then use the generated method to bootstrap frameworks such as a Contexts and Dependency Injection ("CDI") framework. For example, the framework (e.g., CDI framework) is started once during native image generation, prior to runtime, and then the in-memory state of the framework container (e.g., CDI container) is serialized directly into the native image. When running the native image, the already started framework container (e.g., CDI container) is read directly into memory without having to process and build the framework's internal state at runtime. Therefore, no additional processing is required on application startup. For example, the Substrate VM may take the in-memory state of the JVM after all static initializers have run and serialize the in-memory state into a native executable.

In general, applications started using Substrate VM start faster than the traditional JVM approach because the application code is already compiled. However, the techniques disclosed herein allow for even faster application startup times than using Substrate VM alone. When running the native image, the already started framework container is read directly into memory without any additional processing on startup using the techniques disclosed herein. The native image (e.g., image that was created from serializing a framework container at compilation time and that is capable of starting runtime services of an application) results in an application that may be run with reduced application startup time and with less runtime memory usage. For example, generating the native image prior to runtime (e.g., at compilation time) improves efficiency by allowing runtime services to start sooner and with a smaller runtime memory footprint. Specifically, the native image has a decreased image size because there is no initialization code in the final image. Additionally, the native image allows the application to load and execute faster because the already started CDI container may be read directly into memory.

By creating a static initialization method and then using the generated method to bootstrap frameworks to configure and deploy applications using the native images generated from the compiler, fewer resources are consumed when starting application instances at runtime. For example, rather than processing the application at runtime, the native image may be directly executed at runtime to conserve system resources and reduce application startup time.

The present disclosure is especially advantageous to cloud providers that want to optimize the efficiency of the cloud by reducing startup times and reducing memory usage. For example, runtime services of an application started from native images generated at compilation time may allow for almost instant startup times and require less memory of the JVM as compared to traditional approaches.

For example, overhead reduction may be achieved because the native image does not include initialization code in the final image and because the framework is started prior to runtime. Generating a native image with the initialization code may increase overhead because the initialization code may typically have many classes (e.g., thousands of classes), which are then loaded at runtime even though those classes are not required for runtime services. These initialization classes may then continue to hang around in the runtime environment resulting in a constant drain of runtime memory. As previously discussed, starting frameworks such as JVM based frameworks can involve significant overhead associated with building the framework's internal state, which may also increase overhead compared to the techniques herein.

The techniques described above can be used for most JAVA frameworks as long as the frameworks do not open a socket during bootstrap. Even for frameworks that require a socket, the processes described above can be applied by splitting up the bootstrap process into two different parts, with one part executed from the generated static initialization method and the second part executed when the image is actually run. For example, the framework may be modified to a two-stage framework that supports two-stage bootstrapping.

FIG. 1 depicts a high-level component diagram of an example computing system 100 in accordance with one or more aspects of the present disclosure. The computing system 100 may include a compiler 160, class files 162A-C, one or more containers 170A-B, and nodes (e.g., nodes 110A-C). Containers 170A-B may be provisioned on the same host or node (e.g., node 110A) or different nodes. For example, container 170A and container 170B may both be provisioned on node 110A. Alternatively, container 170A may be provided on node 110A while container 170B is provisioned on node 110B.

The compiler 160 may be a program running on a processor (e.g., CPU 120A-E or a virtual processor). For example, each processor (e.g., CPU 120A-E, generally referred to herein as processor 120) may each have its own compiler 160 that runs on the processor 120. The compiler 160 may initialize classes (e.g., class files 162A-C) for an application (e.g., application 198A) at compilation time. The compiler may also start a framework, which is described in more detail below, at compilation time resulting in the initialization or starting of a framework container (e.g., container 170A). The compiler 160 may also serialize the framework container 170A into a native image at compilation time (e.g., prior to runtime). The resulting native image may have a small memory footprint because it does not include initialization code. The small memory footprint and running the native image by reading the already started CDI container directly into memory results in reduced application startup times, which is especially important for cloud environments. In an example, the native image may be stored in a native image cache 132.

The compiler 160 may operate according to a specific static initialization method that is generated by a processor 120. In an example, a code generation module may execute on a processor and may be configured to generate the static initialization method. A static initialization method may utilize a static block (also called a static clause or a static initialization block), which is a special block supported by JAVA. The static block may be used for static initializations of a class. The code inside a static block may be executed the first time an object of that class is made or the first time a static member of that class is accessed. For example, the static initializer may be run only one time before the constructor or main method is called. In a JAVA class, a static block may be a set of instructions that is run when a class is loaded into memory. The static block or static initialization block may be used for initializing or setting up the class at runtime. Since the block is static, the block spans all instances of the class and acts as a mini-global set of instructions.

The static initialization method may involve class methods, which are methods that are called on JAVA classes themselves and not on a specific object instance. A static method is configured to ensure that implementation is the same across all class instances.

The resulting native image may be executed to start runtime services for various applications (e.g., Applications 198A-D). For example, the native image may be machine code, such as an executable binary that can be executed by virtual machines or physical machines at runtime. In an example, applications 198A-D may be different applications or services. In another example, applications 198A-D may be different instances of the same application or service.

A framework is a platform for developing software applications and provides a foundation on which software developers can build programs for a specific platform. A framework may be a large body (e.g., many different classes) of prewritten code where additional code may be added to perform a specific function. In an example, a framework may include predefined classes and functions that can be used to process inputs and interact with system software, which streamlines the development process. In many cases, a software framework is supported natively by an operating system. While frameworks generally refer to broad software development platforms, frameworks may also be specific components within a larger programming environment. For example, multiple JAVA frameworks exist, which may be used to create JAVA programs.

A developer may make use of a framework by calling the framework's methods. The framework may also be used by supplying callbacks and listeners. Typically, a framework employs an inverted flow of control between the framework and framework clients. As mentioned above, a developer may use a framework by implementing a callback function or by specializing a few of the framework classes and then by invoking a method or procedure. After invoking a method, the framework will then invoke any necessary client callbacks or methods at the appropriate time and place. For example, a framework will often dictate the structure of an application. A common example of a framework is a GUI frameworks. The frameworks have a large amount of code to manage the user interface, and there is inversion of control because a framework (e.g., GUI framework) is started and then a developer may then wait for the framework to call specific listeners.

A framework may have various features that are built in and used by a specific application instance. By further reducing the runtime overhead of applications (e.g., JAVA applications), the present disclosure may provide significant advantages in cloud environments.

Computer systems may run applications or services that are provided via a server or cloud. The applications or services can be developed and deployed as a single unit or as multiple units. Applications 198A-D may run within containers 170A-B, which may be run on or executed within physical or virtual machines. For example, containers 170A-B may encapsulate a lightweight runtime environment for an application. The container 170A-B may be replicated across node clusters. The containers 170A-B may each run a process, service or application (e.g., applications 198A-D). The containers 170A-B, hereinafter referred to generally as container(s) 170, may be executed in any execution environment. For example, the containers 170 may operate as a virtual server. The containers 170 may each have one or more respective, file systems, memory, devices, network ports, etc. for accessing the physical resources of the physical machine and other resources outside of the physical machine.

It should be appreciated that containers 170 may be stand-alone execution environments, similar to that of a virtual machine. The applications 198A-D may run in a container 170 or a virtual machine. In an example, containers 170 may instead be virtual machines that execute applications or services.

A virtual machine may include a virtual machine memory (VM Memory), a virtual CPU (VCPU), virtual memory devices (VMD), and virtual input/output devices (VI/O). In an example, a virtual machine may execute a guest operating system and run applications 198A-B which may utilize the underlying VCPU, VMD, and VI/O device. As mentioned above, one or more applications 198A-B may be running on a virtual machine under the respective guest operating system. A virtual machine may run on any type of dependent, independent, compatible, and/or incompatible applications on the underlying hardware and operating system ("OS"). Additionally, applications 198A-B run on a virtual machine may be compatible with the underlying hardware and/or OS.

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). The memory devices 130A-D may include native image cache (e.g., native image cache 132 of MD 130A). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Containers 170A-B may be provisioned on the same host or node (e.g., node 110A) or different nodes. For example, container 170A and container 170B may both be provisioned on node 110A. Alternatively, container 170A may be provided on node 110A while container 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
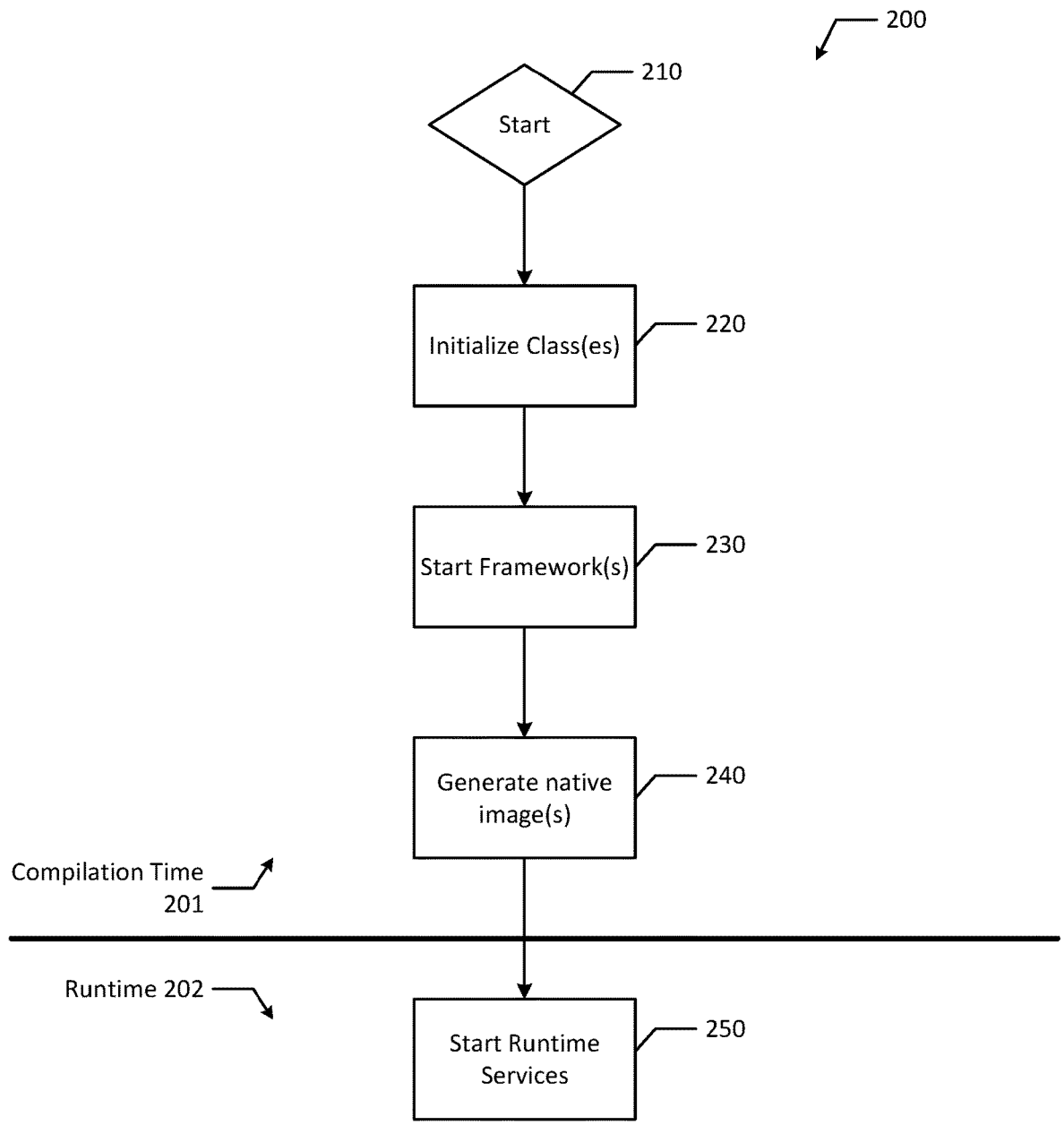
FIG. 2 illustrates a flowchart of an example process for generating a native image for an application at compilation time according to an example embodiment of the present disclosure.

FIG. 2 illustrates a flowchart of an example method 200 for generating a native image for an application at compilation time. The native image may be used for application deployment. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes starting an application build (block 210) prior to runtime 202 (e.g., at compilation time 201). Then, method 200 includes initializing class(es) 162 (block 220) and starting framework(s) (block 230). The framework may be a CDI framework. Then, native image(s) are output or generated for the class(es) 162 (block 240) prior to runtime 202. Starting the framework prior to runtime and creating a native image without any initialization code provides a native image with a small memory footprint that can be used to efficiently and quickly start application runtime services. For example, the native image(s) may exclude initialization code.

Then, at runtime 202, method 200 includes starting runtime services (block 250). For example, the native image may be executed to start runtime services. The native image may be run directly, advantageously allowing runtime services to be started efficiently without having to generate or write out additional application code at runtime 202. By pre-generating the native image using a compiler 160, the techniques disclosed herein conserve system resources (e.g., runtime memory) and reduce startup times of applications 198. The memory savings become more substantial when starting nodes or application instances in cloud environments. For example, using an additional MB of memory at compilation time may not appear significant for a single application, but in cloud environments with thousands of nodes running application instances (where each would use an additional MB of runtime memory), the runtime memory savings is more pronounced on a large scale, the reduction in necessary hardware (e.g., RAM) may be quite significant.

Figure 3:
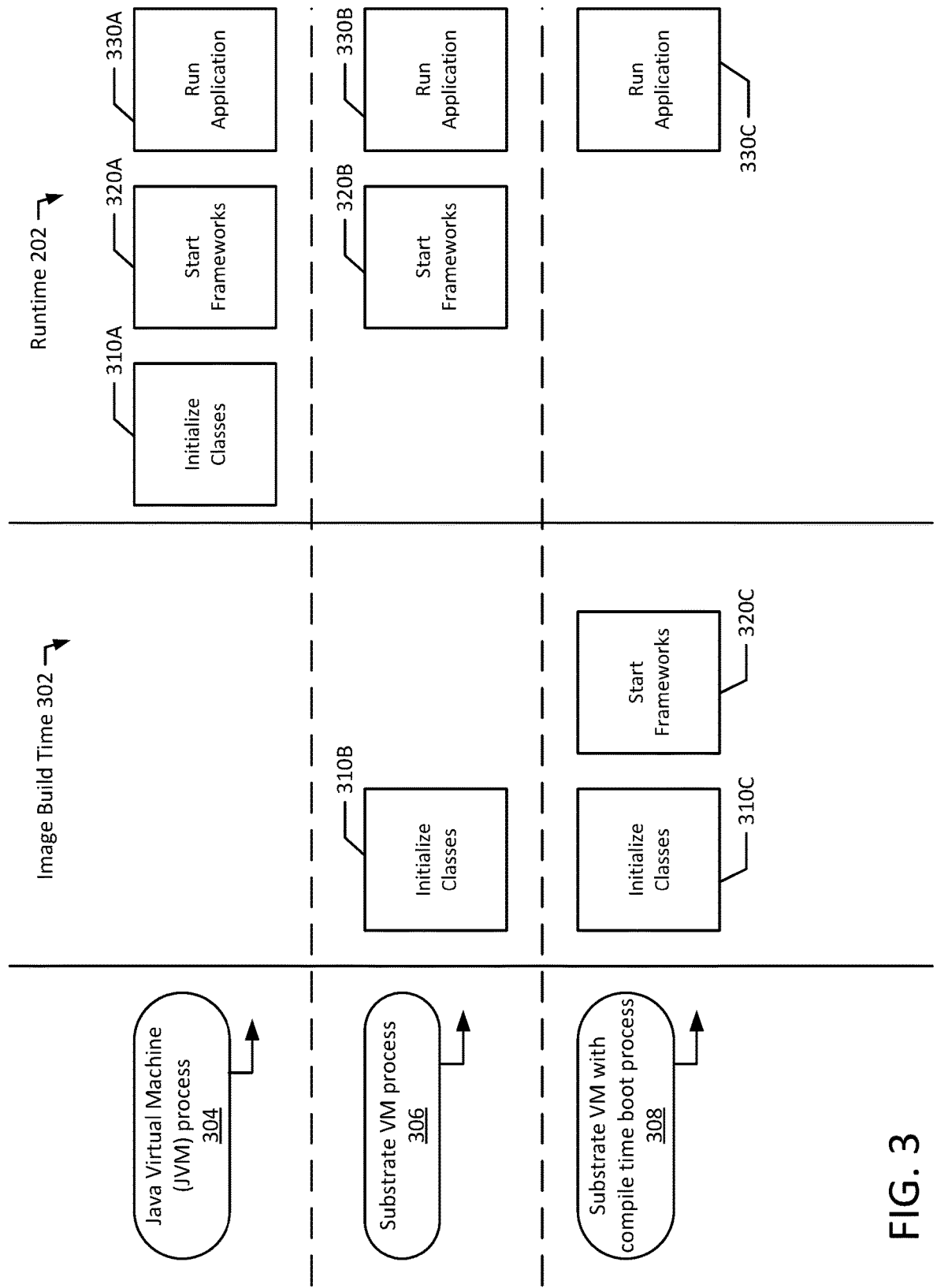
FIG. 3 illustrates various methods for building an image and running an application according to various example embodiments of the present disclosure.

FIG. 3 illustrates various processes for building an image and running an application using either a JVM process 304, a Substrate VM process 306, or a Substrate VM with compile time boot process 308 as further described herein. Building an image and running an application with JVM process 304 typically involves initializing classes 162 (block 310A), starting frameworks (block 320A) and running the application 198 (block 330A) at runtime 202. By performing the initialization, starting frameworks and running the application (blocks 310A, 320A and 330A) all at runtime 202, additional processing and system resources are consumed at runtime 202, which increases application startup time thereby delaying application startup. Additionally, the application 198 may have a larger memory footprint as compared to other approaches, which are described below.

Using Substrate VM process 306, however, classes may be initialized (block 310B) prior to runtime 202, at image build time 302. Similar to the JVM approach discussed above, the frameworks are started (block 320B) and the application is run (block 330B) at runtime 202. By initializing classes prior to runtime 202, at image build time 302, Substrate VM process 306 may reduce application startup time and reduce the memory footprint of the application by eliminating initialization classes that may otherwise be loaded at runtime using the JVM process 304.

Conversely, using Substrate VM with compile time boot process 308, the classes may be initialized (block 310C) and the frameworks may be started (block 320C) prior to runtime 202 (e.g., at image build time 302). Then, at runtime 202, the process of running the application occurs (block 330C). For example, a native image may be executed to start runtime services of the application 198. The native image may have a decreased image size because the native image excludes initialization code in the finalized native image as with the Substrate VM process 306. Furthermore, by starting the framework prior to runtime 202, the overhead associated with starting the framework is avoided at runtime 202 when using the Substrate VM with compile time boot process 308.

Figure 4:
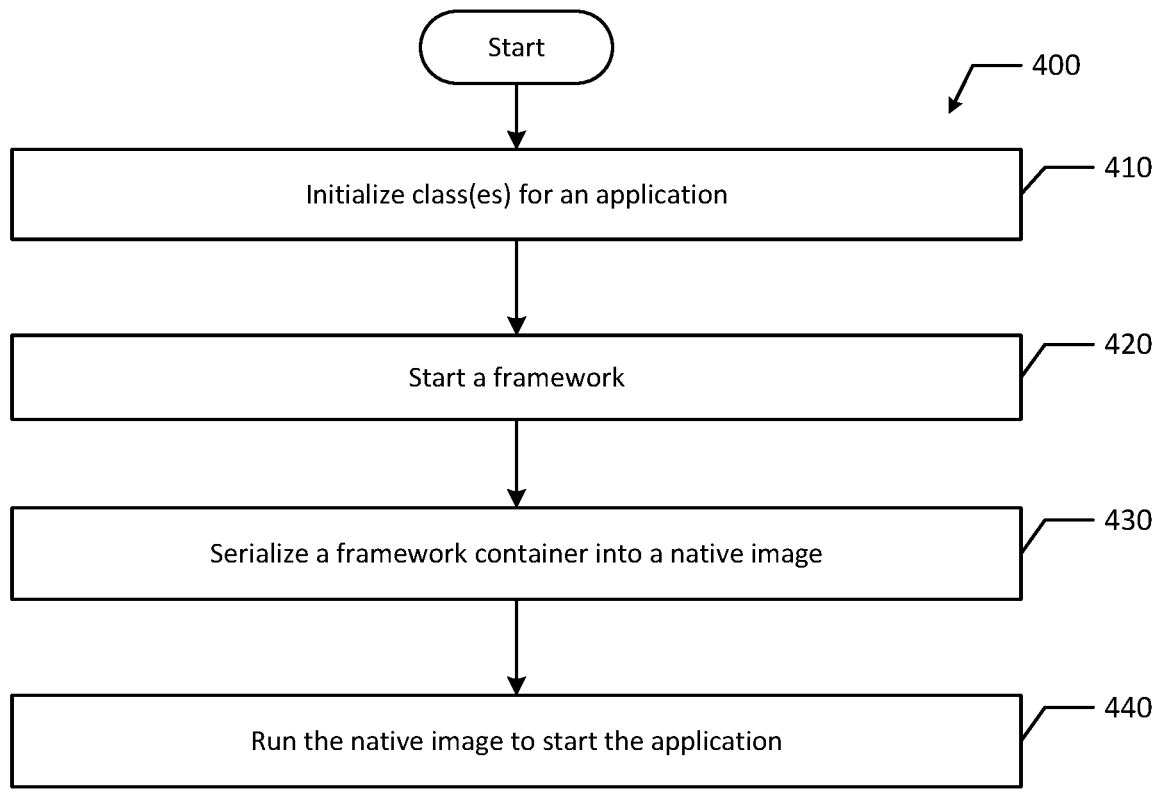
FIG. 4 illustrates a flowchart of an example process for serializing a framework container into a native image and executing the native image according to an example embodiment of the present disclosure.

FIG. 4 illustrates a flowchart of an example method 400 for serializing a framework container into a native image and executing the native image. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example method 400 includes initializing class(es) for an application (block 410). For example, a compiler 160 may initialize class(es) 162 (e.g., classes 162A-C) at compilation time 201. Compilation time 201 may be prior to runtime 202 such that compilation occurs before the application is started or executed in a runtime environment. Then, method 400 includes starting a framework (block 420). For example, the compiler 160 may start a framework at compilation time 201. The framework may be a Contexts and Dependency Injection (CDI) framework. The CDI framework is a dependency injection framework that may be included in JAVA EE 6 and higher. CDI allows developers to manage the lifecycle of components via domain-specific lifecycle contexts and inject components (e.g. services) into client objects in a type-safe way. In an example, the compiler 160 may be part of a different framework.

Additionally, method 400 includes serializing a framework container into a native image (block 430). For example, the compiler 160 may serialize a framework container 170 of the framework into a native image at compilation time 201. The native image may be an executable file that when executed starts the application 198. The native image or executable may be bytecode, which may also be referred to as portable code or p-code. Then, method 400 includes running the native image to start the application (block 440). For example, a processor 120 may run the native image to start the application 198. In an example, running the native image may include reading the framework container 150 directly into memory 130. For example, the native image may be stored in a native image cache.

The compiler 160 or processor 120 that executes the native image may be the same compiler 160 or processor 120 that generated the native image. In another example, the compiler 160 or processor 120 that executes the native image may be different from the compiler 160 or processor 120 that generated the native image. Furthermore, the processor 120 that creates and/or executes the compiler 160 may be the same processor 120 that executes the native image. Additionally, different processors 120 execute the native image. The processors 120 or compilers 160 may be on the same node (e.g., computer or machine) or on different nodes (e.g., computers or machines).

Figure 5:
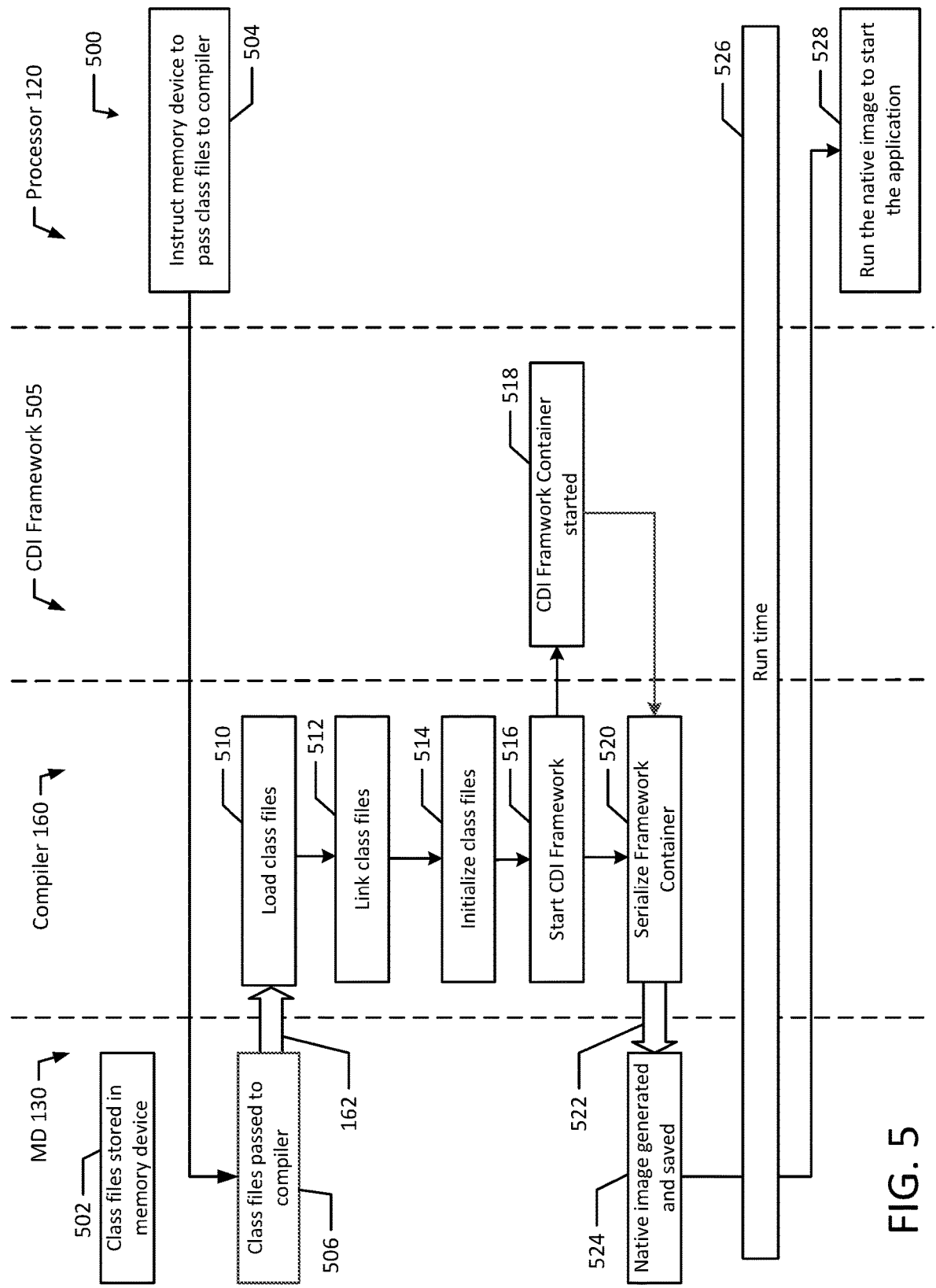
FIG. 5 illustrates a flow diagram of an example process for serialization and application deployment using reduced overhead native images according to an example embodiment of the present disclosure.

FIG. 5 illustrates a flowchart of an example method 500 for object serialization and application deployment in accordance with an example embodiment of the present disclosure. Although the example method 500 is described with reference to the flowchart illustrated in FIG. 5 it will be appreciated that many other methods of performing the acts associated with the method 500 may be used. For example, the order of some of the blocks may be changed, certain blocks may be combined with other blocks, blocks may be repeated, and some of the blocks described are optional. For example, a compiler 160, memory device 130, CDI framework 505 and processor 120 may communicate with classes (e.g., class files 162) to perform example method 500.

In the illustrated example, class files 162 are stored in a memory device 130 (block 502). Class files 162 or classes may be templates or prototypes that are used to create objects, to define object data types and to define methods. For example, class files 162 or classes may be considered categories and objects may be considered items within each category. In an example, class files may be classes that make up CID framework 505. In another example, class files may be additional files used by a developer to develop a new application using CDI framework 505.

Prior to runtime 202, e.g., at compilation time, the processor 120 may instruct the memory device 130 to pass class files 162 to the compiler 160 (block 504). The memory device 130 may receive the instruction and pass the class files 162 to the compiler 160 (block 506). The class files 162 or classes represent a set of properties or methods that are common to all objects of one type. The class files 162 or classes may be made up of modifiers, a class name, keywords and a class body.

After receiving the class files 162, the compiler 160 may load the class files (block 510). For example, the compiler 160 may load class files 162 with a bootstrap class loader, an extension class loader, an application class loader, etc. The bootstrap class loader may be responsible for loading classes from a bootstrap class path. The extension class loader may be responsible for loading classes which are inside an extension folder. Additionally, the application class loader may be responsible for loading application level classes, environment variables, etc. The compiler 160 may also link the class files 162 (block 512). For example, during linking, the compiler 160 may verify that the loaded classes are proper and whether any generated code passes verification. During linking, the compiler 160 may also allocate and assign memory for static variables. Linking the class files 162 may also involve resolving memory references. The compiler 160 may also initialize the class files 162 (block 514). During initialization, static variables may be assigned with original values and the static block may be executed.

Then, the compiler 150 may start the CDI framework 505 (block 516). The CDI framework may be started the same time the class files 162 are loaded or even before the class files 162 are loaded. After the compiler 160 starts the CDI framework 505, a CDI framework container is started or initialized (block 518). The CDI framework container may be started once during native image generation. For example, the CDI framework container that is started may be used to inject various components (e.g., services) and their dependencies prior to generating the native image. Then, the compiler 160 serializes the framework container (block 520). By serializing the framework container, a native image 522 is generated and saved (block 524). For example, the native image 522 that is generated may be saved for later use. In the illustrated example, the native image 522 is generated prior to runtime 202. The native image 522 may have a decreased image size because there is no initialization code in the finalized native image 522. In an example, the native image 522 may be stored in a native image cache, which allows the application to load and execute faster.

At runtime (block 526), which is after compilation time, the processor 120 may run the native image 522 to start the application 198 (block 528). Once the native image 522 is generated, the native image 522 may be executed to start runtime services for several application instances on the cloud (e.g., nodes 110A-C). In the illustrated example, the native image 522 is pre-generated prior to runtime. For example, the native image 522 may be generated well before any application instances are started on the cloud. The resulting deployed application instances may be smaller than an application instance started using traditional approaches. By reducing runtime overhead of applications 198 (e.g., JAVA applications), the memory footprint and memory consumption is advantageously reduced which provides performance and cost advantages, specifically in cloud environments.

Figure 6:
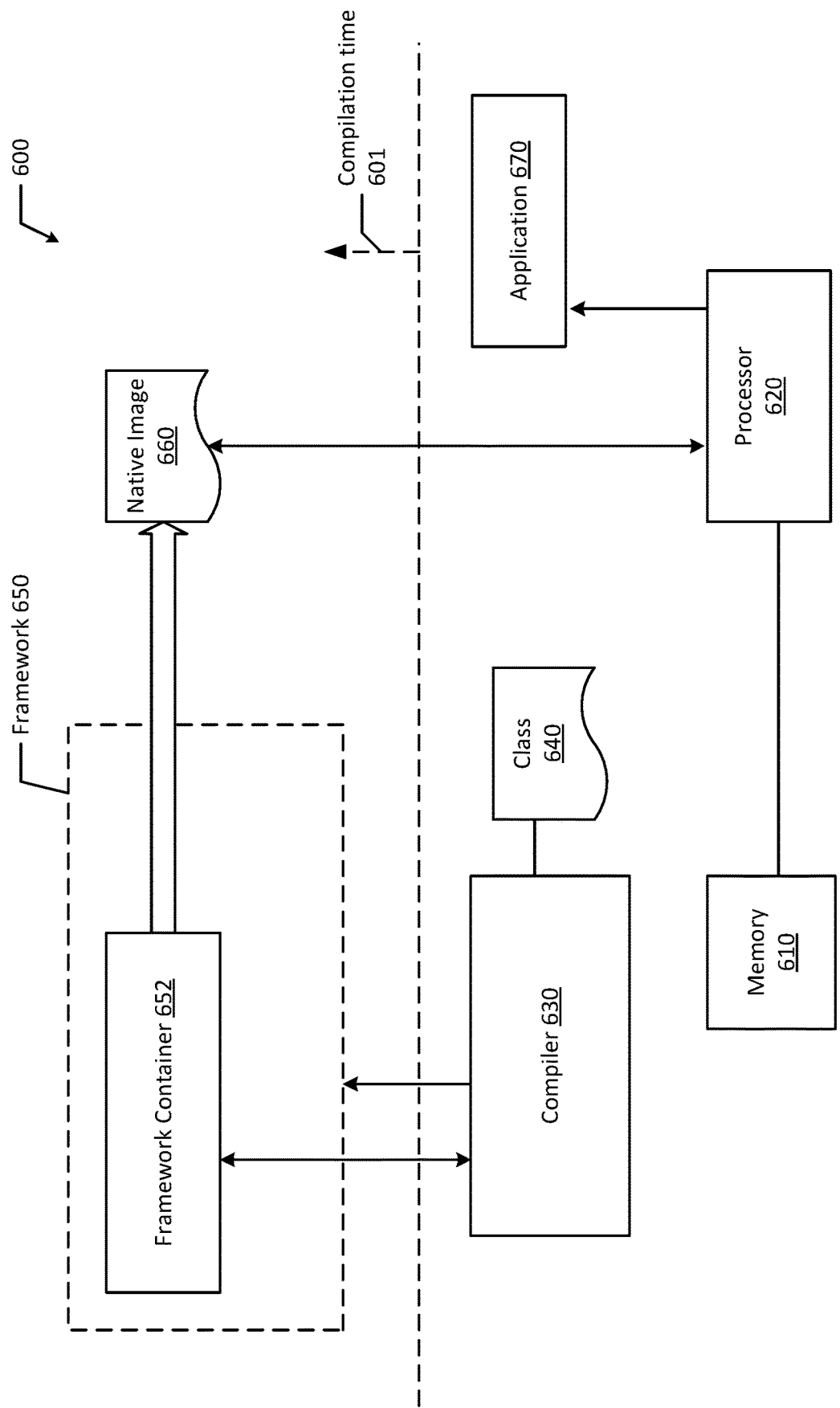
FIG. 6 illustrates a block diagram of an example serialization system according to an example embodiment of the present disclosure.

FIG. 6 is a block diagram of an example serialization system 600 according to an example embodiment of the present disclosure. The serialization system 600 includes a memory 610, a processor 620 in communication with the memory 610, and a compiler 630. The compiler 630 is configured to initialize at least once class 640 for an application 670 at compilation time 601. The compiler 630 is also configured to start a framework 650 at compilation time 601. Additionally, at compilation time 601, the compiler 630 is configured to serialize a framework container 652 of the framework 650 into a native image 660. Then, the processor 620 is configured to run the native image 660 to start the application 670. For example, the application 670 may be started at runtime after compilation time 601.

A user (e.g., developer or programmer) may automatically generate native images of an application 670 from classes 640 using the compiler 630, instead of directly writing out application code, which may require extensive knowledge of virtual machine internals or coding expertise. By generating the native image 660 prior to runtime (e.g., at compilation time 601) and running the native image 660 at runtime, the resulting application 670 uses less runtime memory, provides increased startup efficiency, and reduces overall application deployment resource requirements. For example, applications 670 started or configured with native images created from framework containers 652 at compilation time 601 may save time and reduce the instant memory consumption of the application instance at runtime thereby reducing the memory footprint of the application during the application's life.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   a processor in communication with the memory; and
   a compiler configured to:
   initialize at least one class for an application at compilation time,
   start a framework at compilation time,
   build an internal state of the framework,
   serialize a framework container of the framework, including the internal state, into
   a native image at compilation time, and
   wherein the processor is configured to generate a static initialization method and run the native image to start the application, and
   wherein the framework supports two-stage bootstrapping, and a first stage of the two-stage bootstrapping is executed from the static initialization method and a second stage of the two-stage bootstrapping is executed when the native image is run.

2. The system of claim 1, wherein compilation time is prior to runtime.

3. The system of claim 1, wherein a code generation module executes on the processor, and the code generation module is configured to generate the static initialization method.

4. The system of claim 1, wherein the framework is a Contexts and Dependency Injection (CDI) framework.

5. The system of claim 1, wherein the compiler is configured to run the native image by reading the framework container directly into memory.

6. The system of claim 1, wherein the compiler is part of a second framework.

7. A method comprising:
   at compilation time, initializing, by a compiler, at least one class for an application;
   at compilation time, starting, by the compiler, a framework;
   at compilation time, build an internal state of the framework;
   at compilation time, serializing, by the compiler, a framework container of the framework, including the internal state, into a native image; and
   running, by a processor, the native image for the application,
   wherein the framework supports two-stage bootstrapping, and a first stage of the two-stage bootstrapping is executed from a static initialization method and a second stage of the two-stage bootstrapping is executed when the native image is run.

8. The method of claim 7, wherein compilation time is prior to runtime.

9. The method of claim 7, further comprising generating, by the processor, the static initialization method.

10. The method of claim 9, wherein a code generation module executing on the processor generates the static initialization method.

11. The method of claim 7, wherein the framework is a Contexts and Dependency Injection (CDI) framework.

12. The method of claim 7, wherein running the native image includes reading the framework container directly into memory.

13. The method of claim 7, wherein the compiler is part of a second framework.

14. A non-transitory machine-readable medium storing code, which when executed by a processor is configured to at compilation time, initialize at least one class for an application;
   at compilation time, start a framework;
   at compilation time, build an internal state of the framework;
   at compilation time, serialize a framework container of the framework, including the internal state, into a native image; and
   run the native image for the application,
   wherein the framework supports two-stage bootstrapping, and a first stage of the two-stage bootstrapping is executed from a static initialization method and a second stage of the two-stage bootstrapping is executed when the native image is run.

15. The non-transitory machine-readable medium of claim 14, wherein compilation time is prior to runtime.

* * * * *